(12) United States Patent
Lee et al.

(10) Patent No.: US 11,316,402 B2
(45) Date of Patent: Apr. 26, 2022

(54) ROTOR AND MOTOR INCLUDING SAME

(71) Applicant: LG INNOTEK CO., LTD., Seoul (KR)

(72) Inventors: Jong Chan Lee, Seoul (KR); Byung Sam Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 148 days.

(21) Appl. No.: 16/634,716

(22) PCT Filed: Apr. 19, 2018

(86) PCT No.: PCT/KR2018/004554
§ 371 (c)(1),
(2) Date: Jan. 28, 2020

(87) PCT Pub. No.: WO2019/031685
PCT Pub. Date: Feb. 14, 2019

(65) Prior Publication Data
US 2020/0220425 A1    Jul. 9, 2020

(30) Foreign Application Priority Data

Aug. 9, 2017 (KR) .......................... 10-2017-0101127
Oct. 30, 2017 (KR) .......................... 10-2017-0142528

(51) Int. Cl.
*H02K 7/04* (2006.01)
*H02K 5/20* (2006.01)
*H02K 9/06* (2006.01)

(52) U.S. Cl.
CPC .................. *H02K 7/04* (2013.01); *H02K 5/20* (2013.01); *H02K 9/06* (2013.01)

(58) Field of Classification Search
CPC .. H02K 5/20; H02K 7/04; H02K 9/06; H02K 15/16; H02K 15/165; H02K 1/32
See application file for complete search history.

(56) References Cited

U.S. PATENT DOCUMENTS 5,831,358 A * 11/1998 Bobay .................... H02K 29/10
                                                             310/58
6,147,423 A    11/2000 Byrd
(Continued)

FOREIGN PATENT DOCUMENTS

CN    202475060        10/2012
DE     2346345 A  *    3/1975
(Continued)

OTHER PUBLICATIONS

Schweikert, Machine Translation of DE2346345, Mar. 1975 (Year: 1975).*
(Continued)

*Primary Examiner* — Quyen P Leung
*Assistant Examiner* — Eric Johnson
(74) *Attorney, Agent, or Firm* — KED & Associates LLP

(57) ABSTRACT

An embodiment relates to a rotor and a motor including the same, the rotor comprising: a rotor core; coils wound around the rotor core; covers respectively arranged at the upper part of the rotor core, wherein the cover includes: a main body disposed at the rotor core; a plurality of blades arranged on the upper surface of the main body; and at least two first protruding parts protruding in the axial direction from the upper surface of the main body. Therefore, the rotor and the motor including the same can perform a balance correction operation.

13 Claims, 17 Drawing Sheets

(56) References Cited

U.S. PATENT DOCUMENTS

2009/0189472 A1    7/2009  Koumura et al.
2013/0076212 A1    3/2013  Park et al.
2015/0326085 A1*  11/2015  Lee ........................ H02K 3/527
                                                                               310/214

FOREIGN PATENT DOCUMENTS

| FR | 2856532 A1 * | 12/2004 | ........... H02K 21/042 |
|----|---|---|---|
| JP | 58-1137 U | 7/1984 | |
| JP | 59-107576 U | 7/1984 | |
| JP | 60-14043 U | 3/1987 | |
| JP | 62-048145 U | 3/1987 | |
| JP | S62-048145 | 3/1987 | |
| JP | H06-78479 A | 3/1994 | |
| JP | H11-299191 | 10/1999 | |
| JP | 2007-028762 | 2/2007 | |
| JP | 2009-183042 | 8/2009 | |
| JP | 2011-211862 | 10/2011 | |
| JP | 2012-165534 | 8/2012 | |
| KR | 10-2004-0071393 | 8/2004 | |
| KR | 20160070499 A * | 6/2016 | ............... H02K 1/22 |
| KR | 10-2017-0077516 | 7/2017 | |
| WO | WO-2013136020 A2 * | 9/2013 | ............... H02K 9/06 |

OTHER PUBLICATIONS

European Search Report dated Mar. 26, 2021 issued in Application No. 18843545.7.
Chinese Office Action dated May 31, 2021 issued in Application No. 201880051861.9.
International Search Report dated Jul. 24, 2018 issued in Application No. PCT/KR2018/004554.
Korean Office Action dated Dec. 15, 2021 issued in Application No. 10-2017-0101127.
Japanese Office Action dated Feb. 22, 2022 issued in Application 2020-506918.

* cited by examiner

【FIG. 1】
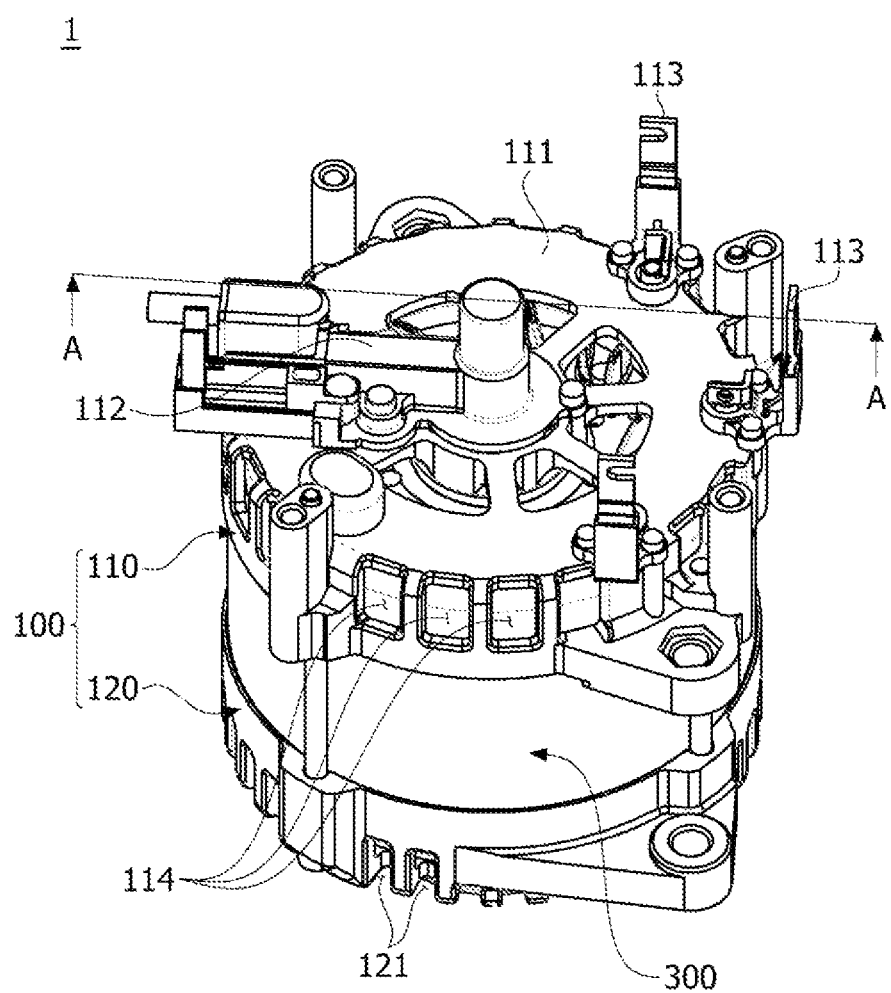

【FIG. 2】
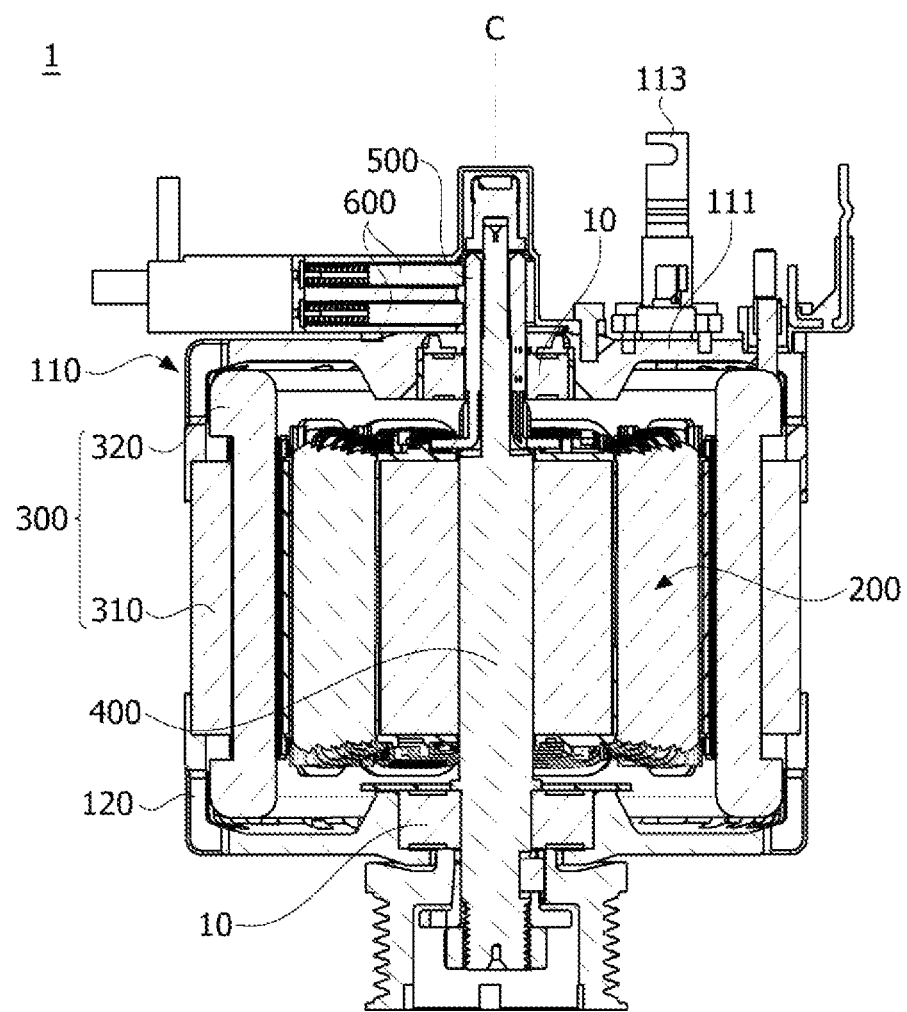

[FIG. 3]
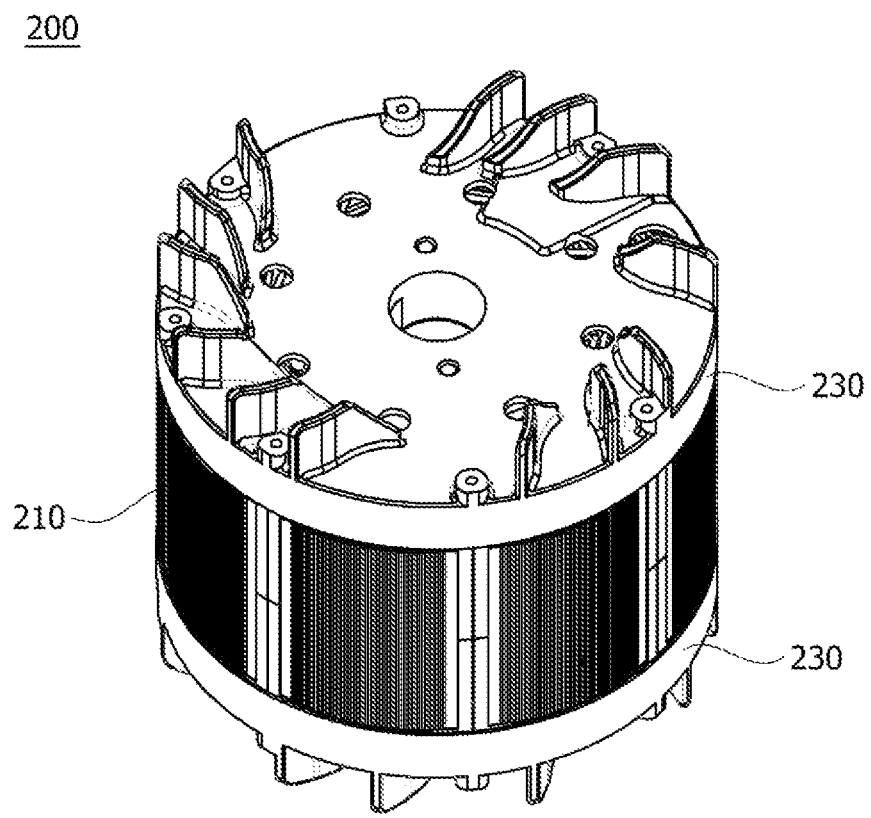

[FIG. 4]
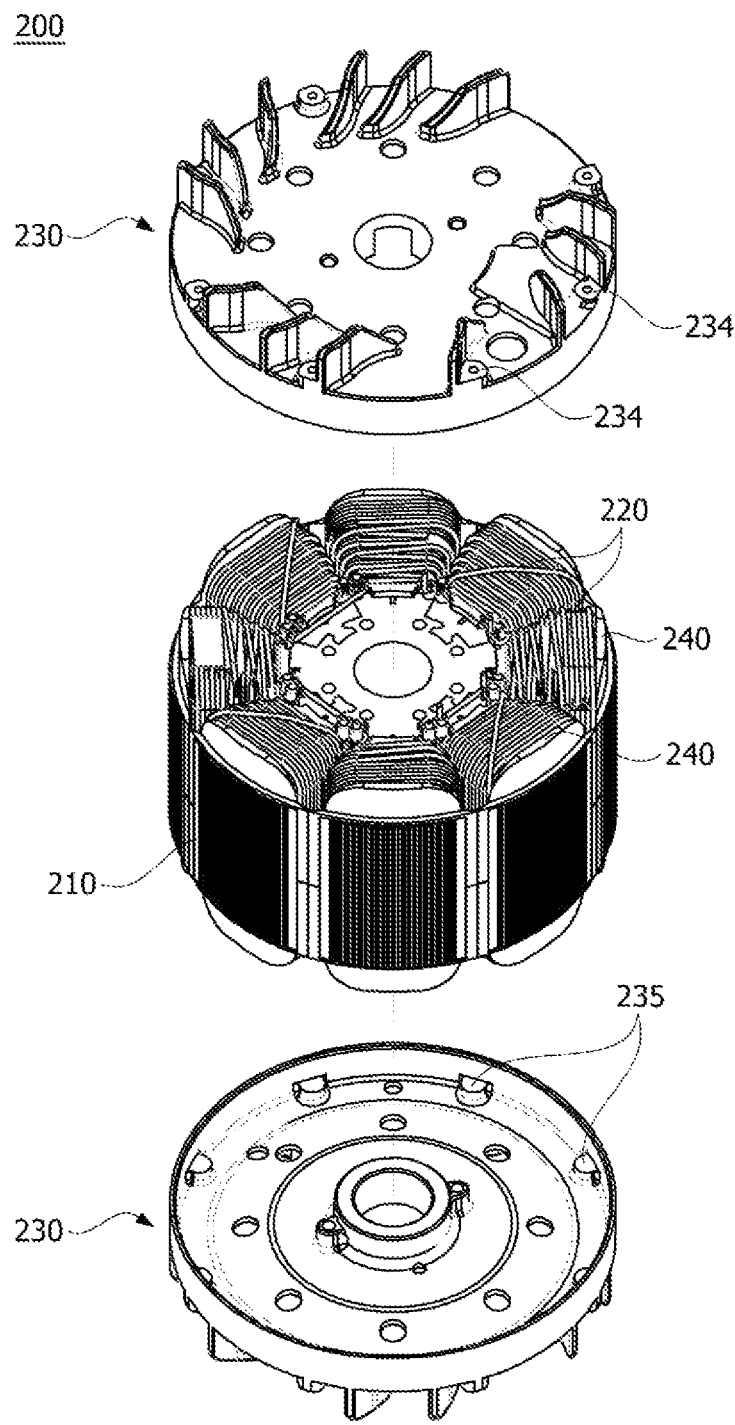

[FIG. 5]
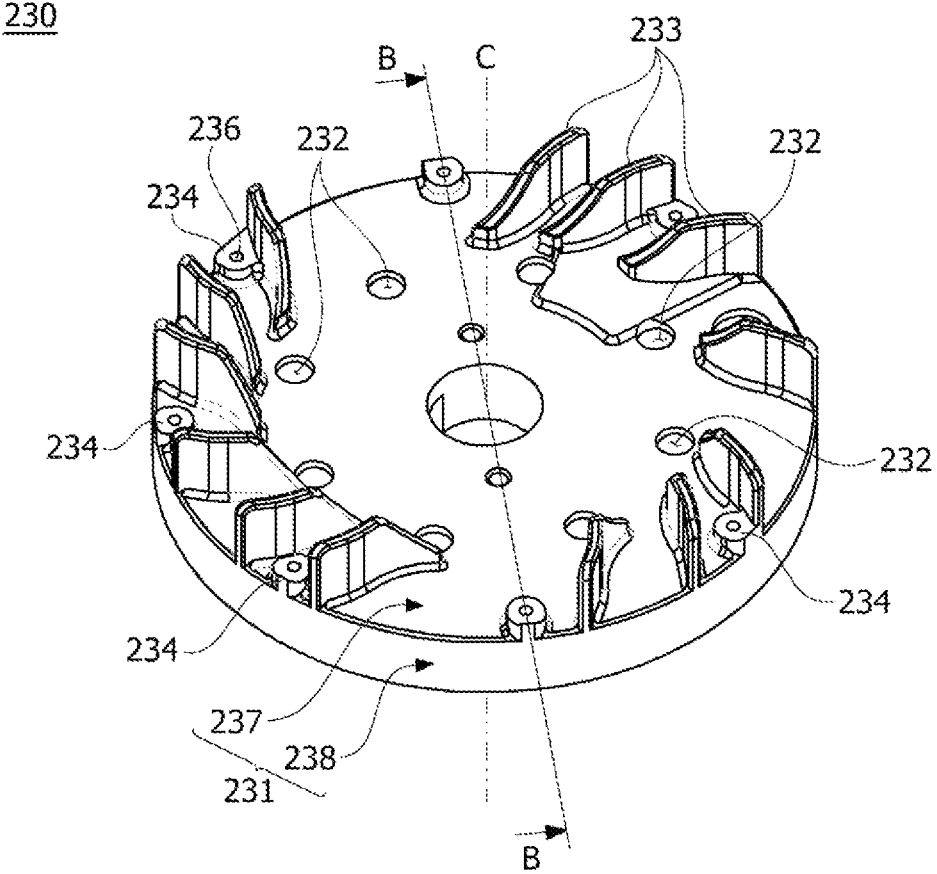

[FIG. 6]
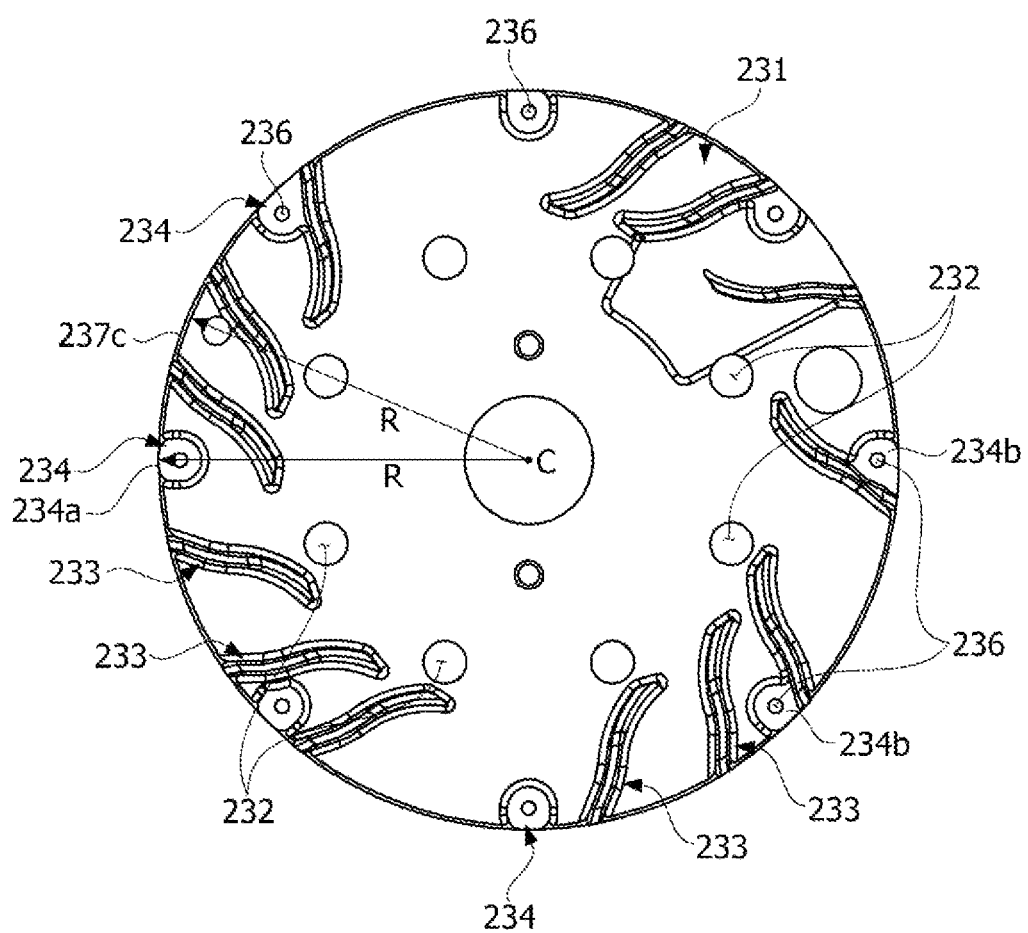

[FIG. 7]
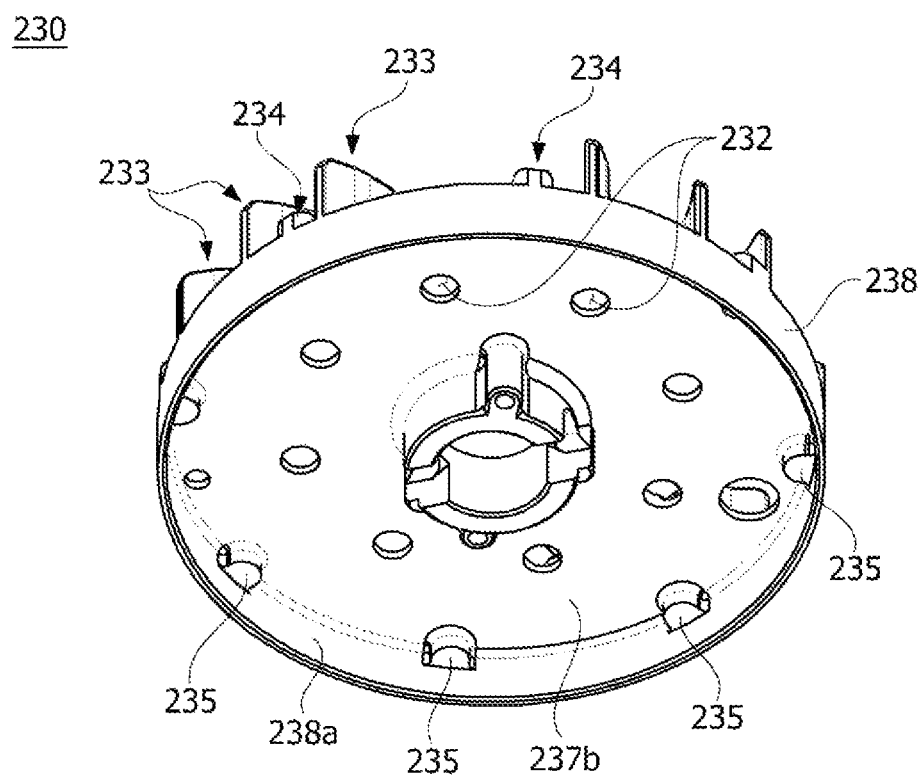

[FIG. 8]
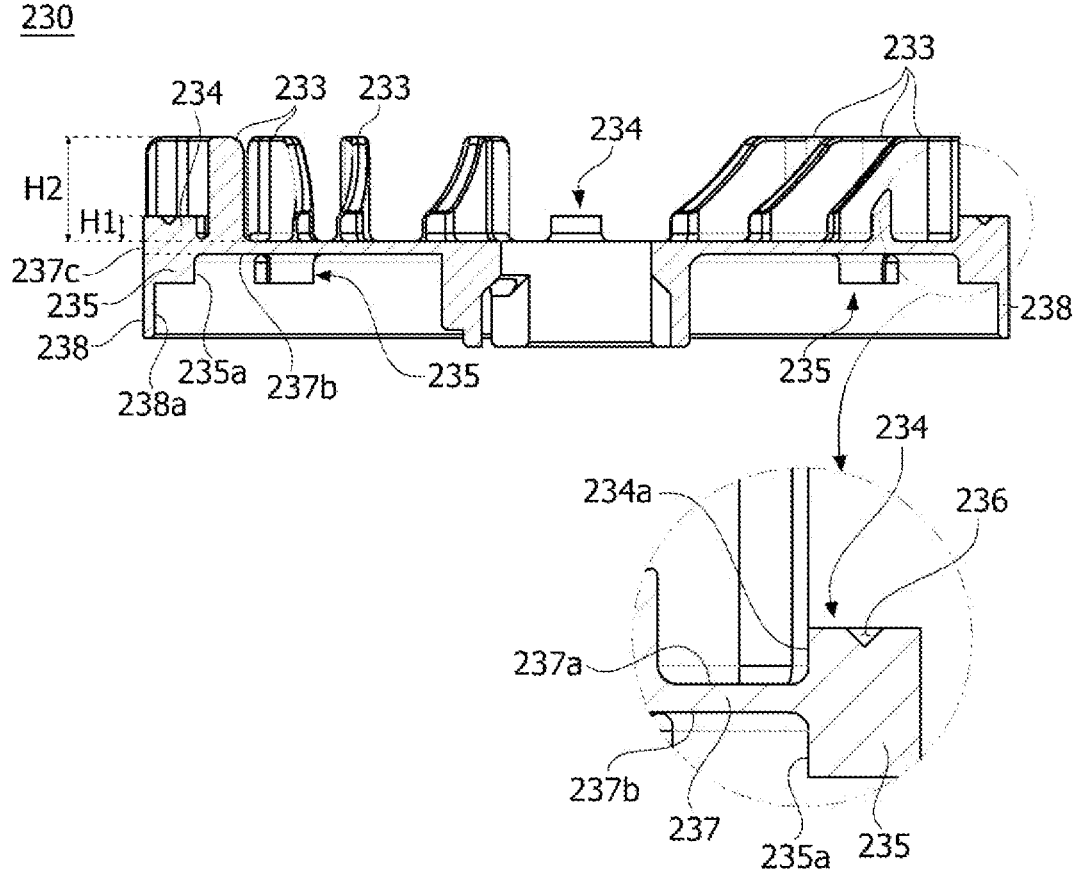

[FIG. 9]
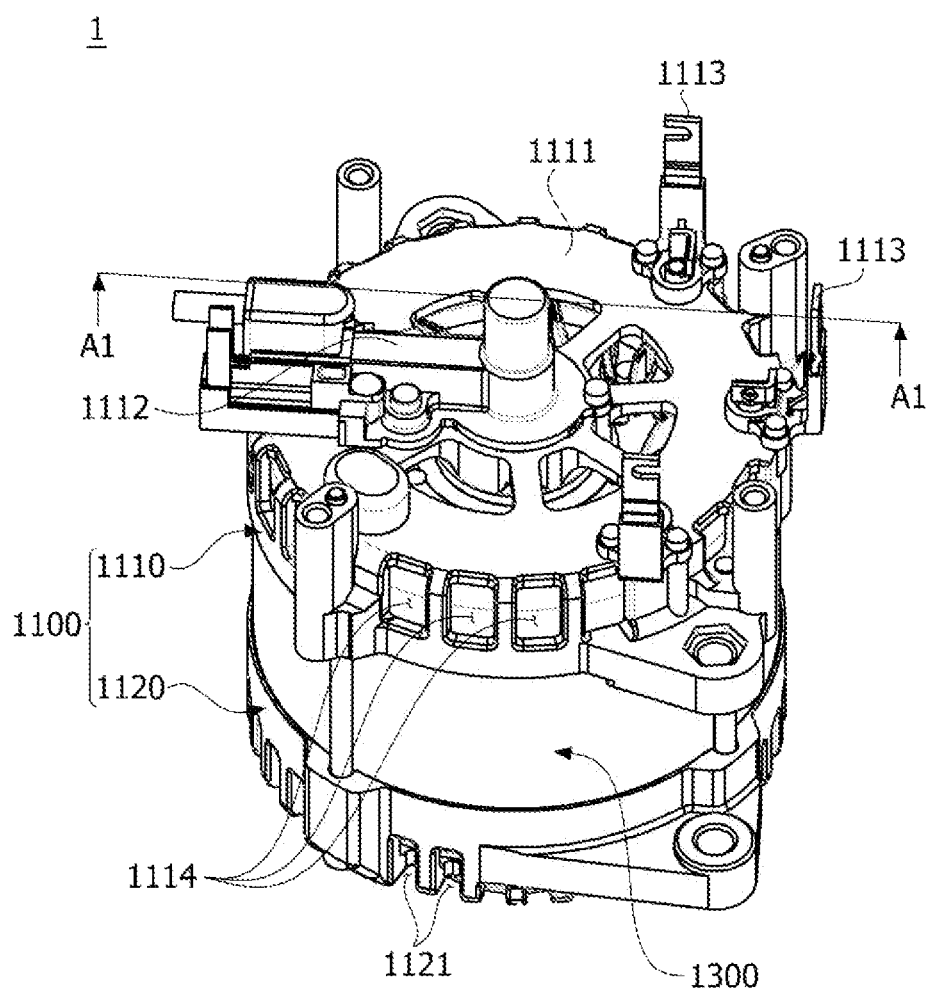

[FIG. 10]
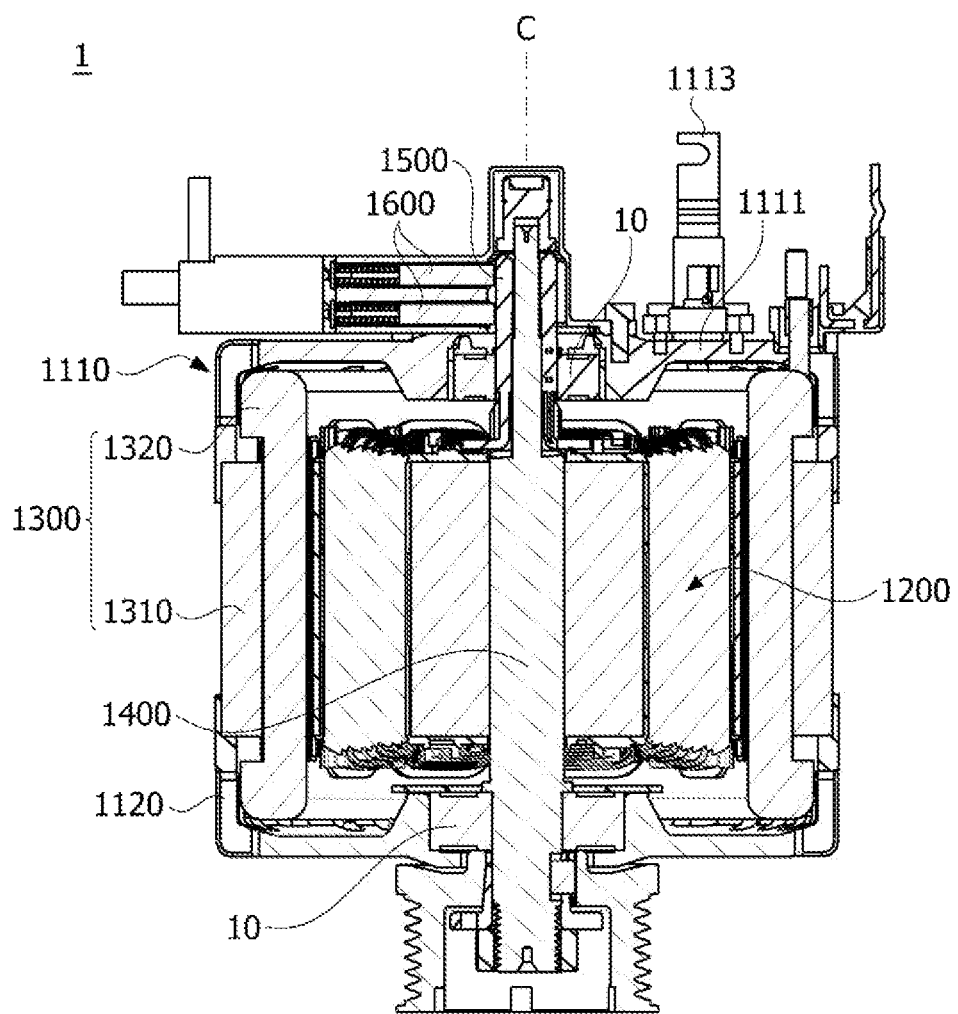

[FIG. 11]
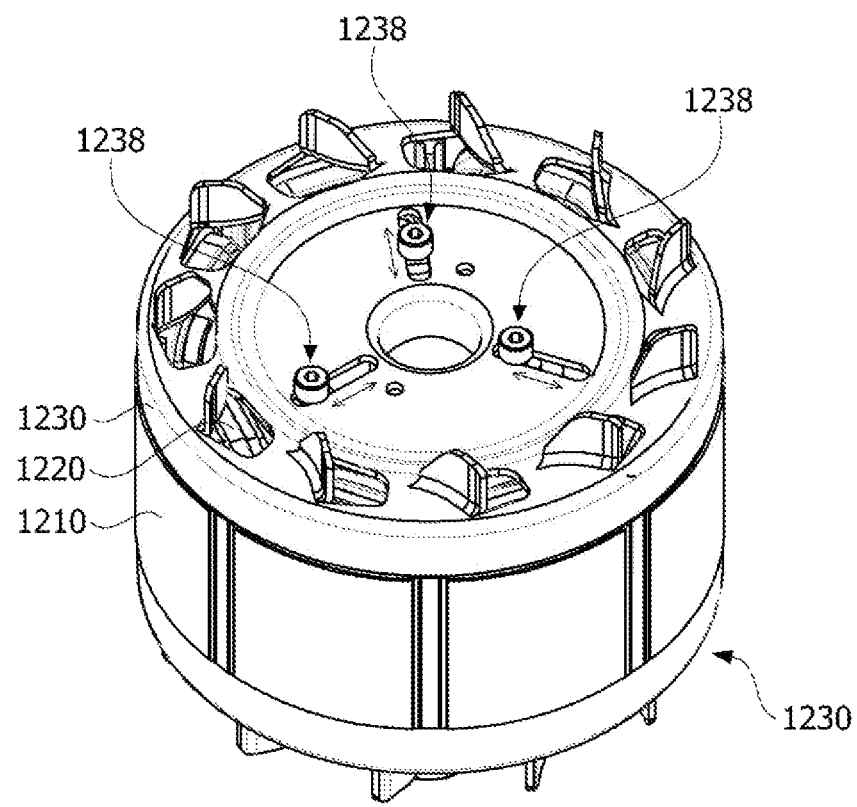

[FIG. 12]
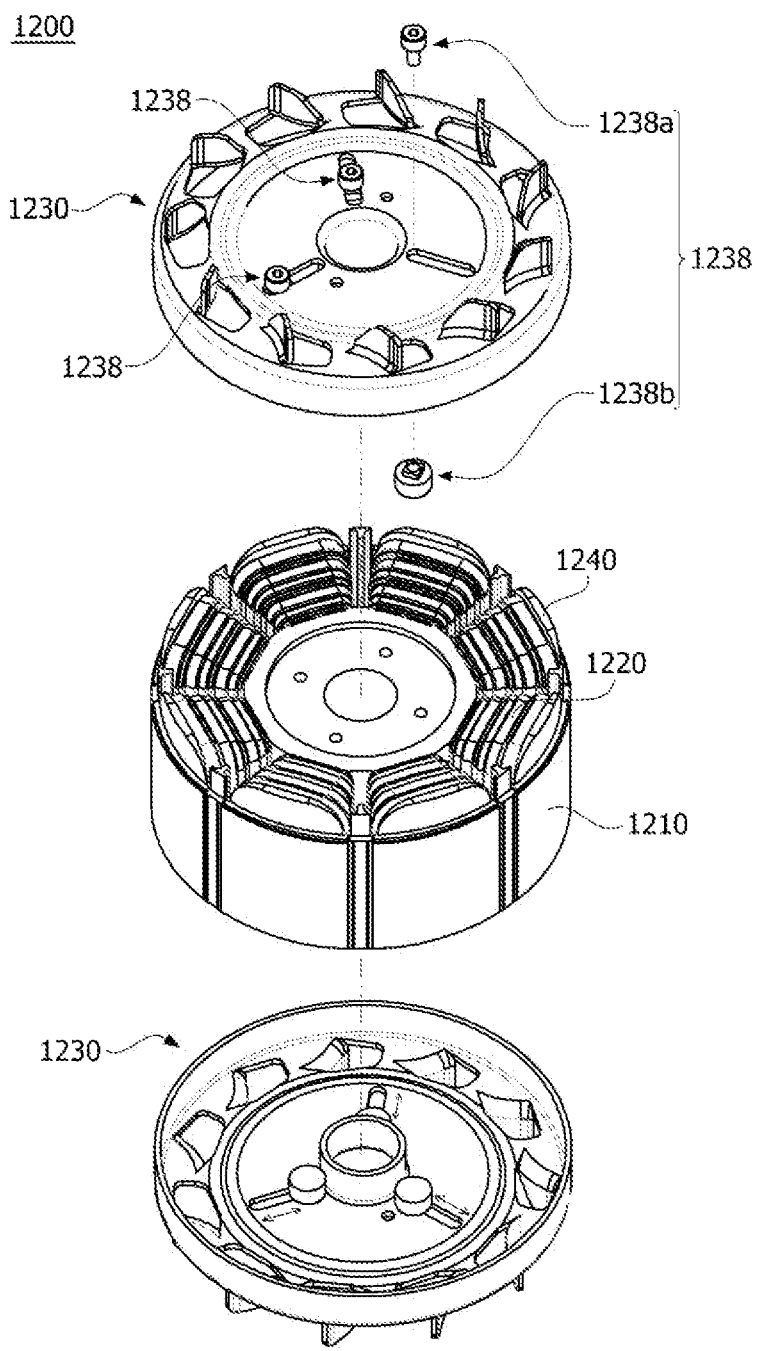

【FIG. 13】
1230
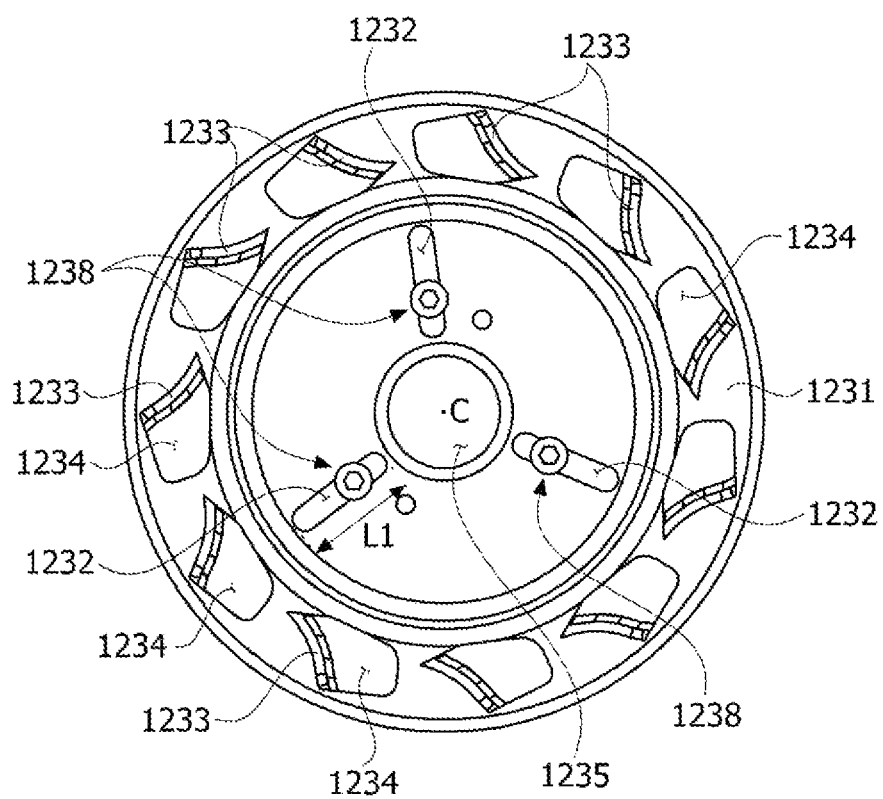

[FIG. 14A]
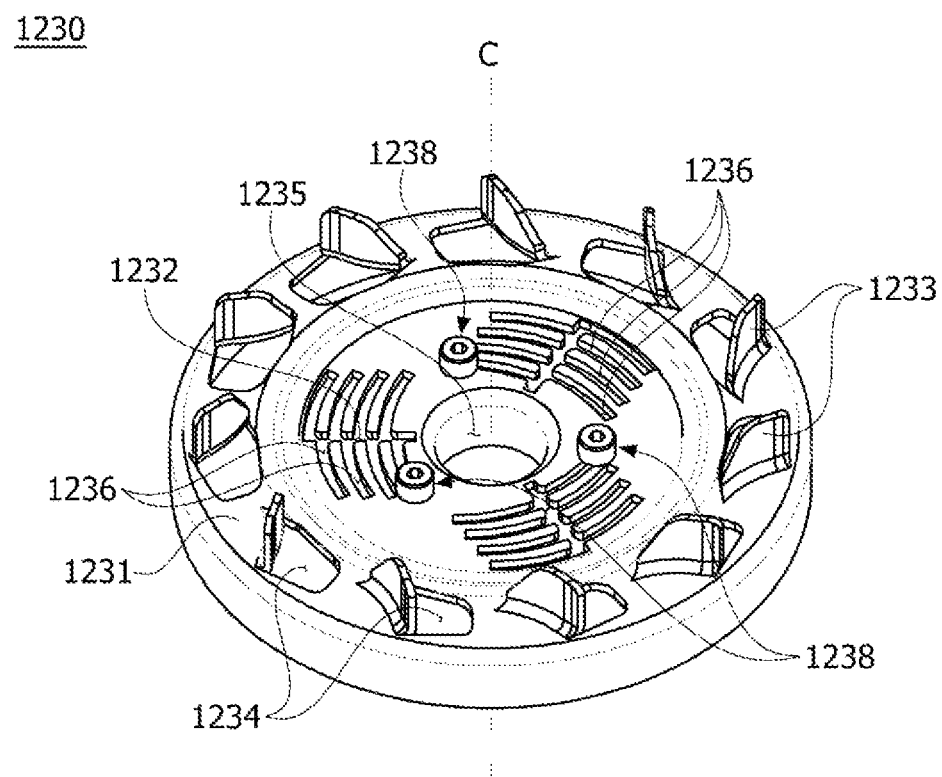

【FIG. 14B】
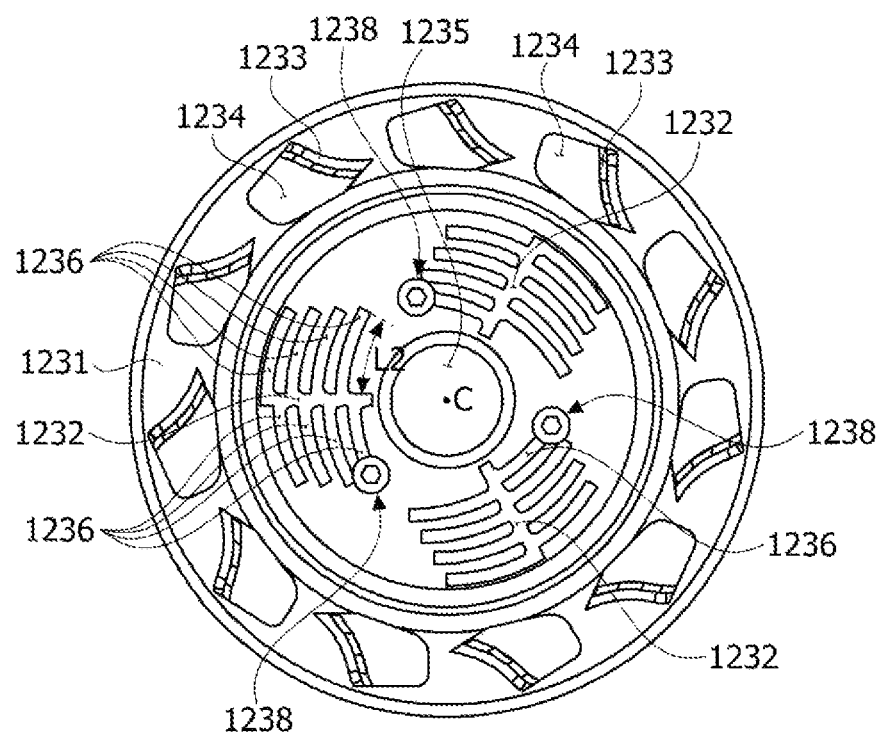

【FIG. 15A】
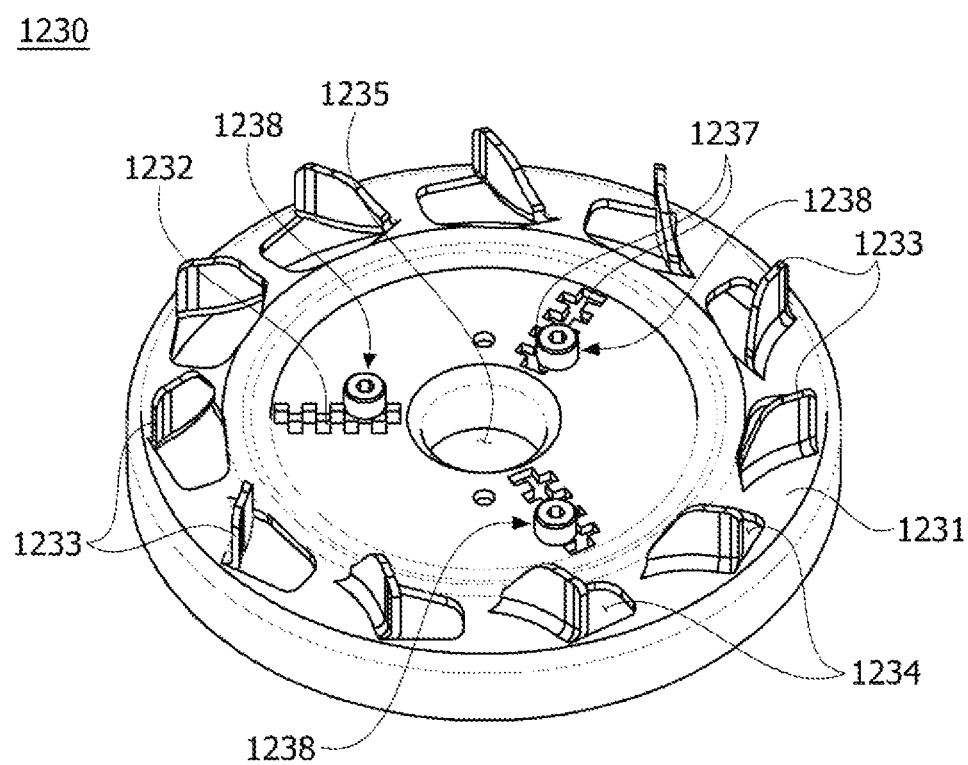

【FIG. 15B】
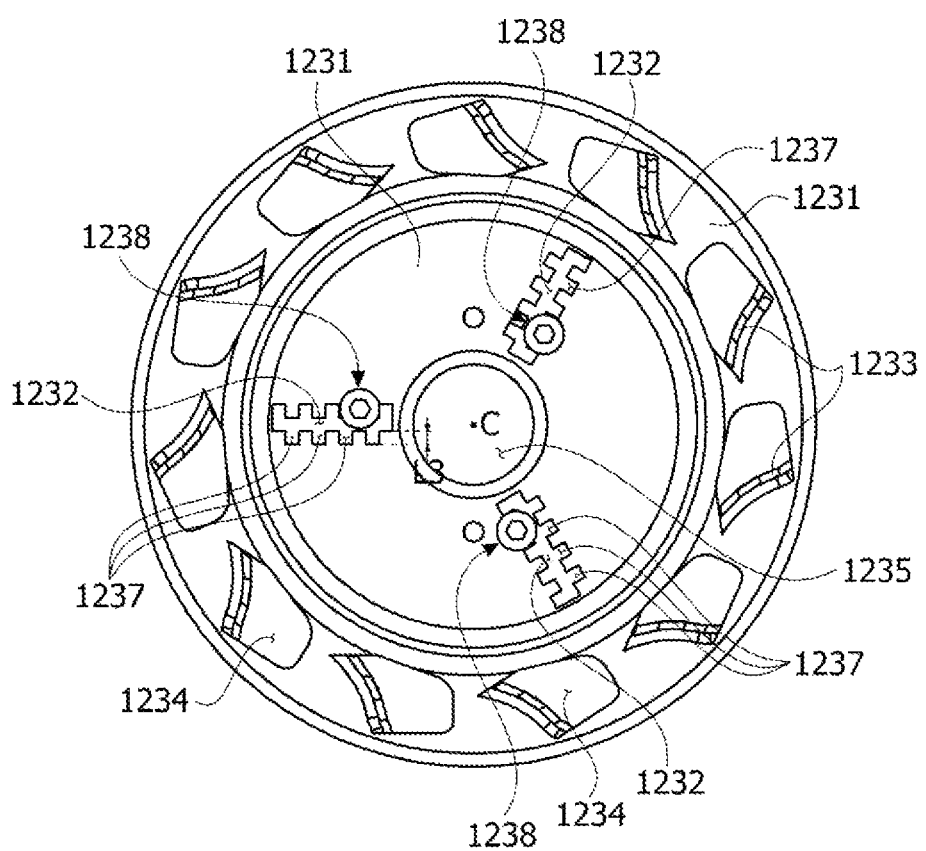

ROTOR AND MOTOR INCLUDING SAME

CROSS-REFERENCE TO RELATED PATENT APPLICATIONS

This application is a U.S. National Stage Application under 35 U.S.C. § 371 of PCT Application No. PCT/KR2018/004554, filed Apr. 19, 2018, which claims priority to Korean Patent Application Nos. 10-2017-0101127, filed Aug. 9, 2017 and 10-2017-0142528, filed Oct. 30, 2017, whose entire disclosures are hereby incorporated by reference.

TECHNICAL FIELD

An embodiment relates to a rotor and a motor including the same.

BACKGROUND ART

A motor can include a shaft which is rotatably formed, a rotor coupled to the shaft, and a stator fixed to an inner side of a housing. In this case, the stator is installed with a gap along a circumference of the rotor.

The motor induces rotation of the rotor by the electrical interaction of the rotor and the stator. When a coil is wound around the rotor, a commutator and a brush can be further disposed to supply a current to the coil wound around the rotating rotor. Here, the brush is made of a carbon material and the like, and can be used as a consumable component.

Generally, the commutator is coupled to the shaft to rotate in a state of being connected to the coil, and the brush is coupled to the housing and disposed to be capable of coming into contact with the commutator. In this case, the brush comes into contact with the commutator to supply electricity.

Meanwhile, when the motor is not balanced with respect to the rotor, vibrations and noise can be generated according to driving of the motor. Accordingly, the work of balancing the weight of the rotor with respect to the shaft is performed.

A balance calibration operation of the rotor can be performed by determining a balance correction point through balance measurement and cutting a certain point of a cover corresponding to the balance correction point.

In order to perform the balance calibration operation according to cutting, the cover requires a predetermined wall thickness. Accordingly, the wall thickness decreases space utilization along with increasing the weight and size of the motor.

Meanwhile, the cover can be formed by a zinc die casting method. However, there is a problem that the die casting method using zinc is expensive.

Further, when the balance calibration operation is performed through the cutting process, separate processing equipment is required due to the cutting process. In addition, since a separate cutting process should be performed, productivity is reduced.

In addition, since chips are generated during the cutting process, complicated problems can occur in the balance calibration operation. For example, the chips generated through the cutting can be introduced into the rotor and thus can cause other problems.

DISCLOSURE

Technical Problem

An embodiment is directed to providing a rotor capable of performing a balance calibration operation and a motor including the same.

An embodiment is directed to providing a rotor providing a protruding part for minus balancing and a motor including the same.

An embodiment is directed to providing a rotor configured to move a weight in a radial direction to be capable of performing a balance calibration operation and a motor including the same.

Further, the present invention is directed to providing a rotor using a press process instead of a die casting process to reduce production costs of covers disposed thereon and a motor including the same.

Problems desired to be solved by the present invention are not limited to the above-described problems, and purposes and effects understood from solutions and embodiments which will be described below are also included.

Technical Solution

One aspect of the present invention provides a rotor including: a rotor core; a coil wound around the rotor core; and covers disposed on the rotor core, wherein each of the covers includes a main body disposed on the rotor core, a plurality of blades disposed on an upper surface of the main body, and at least two first protruding parts protruding from the upper surface of the main body in an axial direction.

Further, the main body may include a plate disposed on the rotor core, and a sleeve protruding from an outer circumferential surface of the plate in an axial direction, and the first protruding parts may protrude from an upper surface of the plate in the axial direction.

In addition, the rotor may further include second protruding parts protruding from a lower surface of the plate in an axial direction.

In addition, the plate may be disposed between the first protruding parts and the second protruding parts, and the second protruding parts may extend the first protruding parts in a downward direction.

In addition, the second protruding parts may protrude in an inward direction from an inner circumferential surface of the sleeve.

In addition, the first protruding parts may be disposed to protrude inward from an outer edge of the plate, and may be disposed between the blades.

In addition, some of outer side surfaces of the first protruding parts and the outer circumferential surface of the plate may have the same curvature.

In addition, a height of the first protruding part may be smaller than a height of the blade.

Meanwhile, a groove may be concavely formed in an upper surface of each of the first protruding parts.

Another aspect of the present invention provides a motor including: a shaft; a rotor in which the shaft is disposed; a stator disposed at an outer side of the rotor; and a housing disposed at the stator, wherein the rotor includes a rotor core, a coil wound around the rotor core, and covers disposed on the rotor core, and each of the covers includes a main body disposed on the rotor core, a plurality of blades disposed on an upper surface of the main body, and at least two first protruding parts protruding from the upper surface of the main body in an axial direction.

Further, each of the covers may further include second protruding parts protruding from a lower surface of the main body in an axial direction, and the second protruding parts may extend the first protruding parts in a downward direction with respect to the main body.

In addition, a groove may be concavely formed in an upper surface of each of the first protruding parts.

Meanwhile, the housing may include a first housing disposed on the stator, and a second housing disposed under the stator, and a housing hole may be formed in each of outer circumferential surfaces of the first housing and the second housing.

Here, heat generated from the rotor may move in a radial direction due to rotation of the blades and may be discharged through the housing holes.

Further, the main body may further include a plurality of cover holes formed along a circumferential direction, and heat generated from the coil of the rotor may be discharged through the cover holes formed in the main body.

Still another aspect of the present invention provides a rotor including: a rotor core; a coil wound around the rotor core; and covers disposed on the rotor core, wherein each of the covers includes a main body disposed on the rotor core, a first hole formed in the main body and having a long length in a radial direction, and a weight part coupled to the first hole.

Further, the weight part may include a bolt disposed through the first hole, and a weight disposed at an end portion of the bolt, and the weight may be fixed to an arbitrary point of the first hole according to rotation of the bolt.

In addition, each of the covers may further include a plurality of blades protruding from the main body, and a plurality of second holes formed in the main body, and the blades and the second holes may be disposed along a circumferential direction.

Here, the second hole may be disposed adjacent to the blade, and formed to have a shape the same as that of the blade.

In this case, the blades and the second holes may be formed by a press process.

Further, heat generated by the coil may be discharged through the second holes, and may move in a radial direction due to rotation of the blades.

In addition, the first hole may be disposed radially inward of the blades.

In this case, at least three first holes may be disposed to be rotationally symmetric based on each of the centers of the covers.

Meanwhile, the rotor may include a third hole formed to extend from the first hole in a circumferential direction.

Further, the rotor may include a fourth hole formed to extend from the first hole in a direction perpendicular to a longitudinal direction of the first hole.

Yet another aspect of the present invention provides a motor including: a shaft; a rotor in which the shaft is disposed; a stator disposed at an outer side of the rotor; and a housing disposed at an outer side of the stator, wherein the rotor includes a rotor core in which the shaft is disposed, a coil wound around the rotor core, and covers disposed on the rotor core, each of the covers includes a main body disposed on the rotor core, a first hole formed in the main body with a predetermined length, and a weight part coupled to the first hole, and the weight part moves along the first hole formed in a radial direction.

Here, the housing may include a first housing disposed on the stator, and a second housing disposed under the stator, and each of the first housing and the second housing may include a housing hole in an outer circumferential surface thereof.

Further, each of the covers may further include a plurality of blades protruding from the main body, and a plurality of second holes formed in the main body, and heat generated by the coil may be discharged through the second holes, and may move in a radial direction and be discharged through the housing hole due to rotation of the blades.

Advantageous Effects

A rotor according to an embodiment and a motor including the same can perform a balance calibration operation.

The rotor according to the embodiment and the motor including the same can easily perform a balancing operation of the rotor by providing a protruding part for minus balancing (realizing balancing through mass reduction).

Further, a possible balancing amount can be improved by disposing a second protruding part which extends a first protruding part in a downward direction with respect to the main body.

Accordingly, the first protruding part and the second protruding part disposed at an outer side based on a center can reduce the weight and size of the motor by reducing a thickness of each of covers disposed on the rotor. In this case, since the first protruding part and the second protruding part are disposed at the outermost side of the main body with respect to a radial direction, the thickness of each of the covers can be further reduced.

The rotor according to the embodiment and the motor including the same can perform the balancing operation of the rotor by moving a weight in a radial direction.

Accordingly, the weight and size of the motor can be reduced by reducing the thickness of each of the covers disposed on the rotor.

Further, since the covers are formed through a press process, production costs can be reduced.

In addition, since the covers use the press process, generation of chips according to a cutting process can be prevented.

Various and advantageous advantages and effects of embodiments are not limited to the above, and can be more easily understood in a process of describing specific embodiments.

DESCRIPTION OF DRAWINGS

FIG. 1 is a perspective view illustrating a motor according to a first embodiment.

FIG. 2 is a cross-sectional view taken along line A-A in FIG. 1.

FIG. 3 is a perspective view illustrating a rotor of the motor according to the first embodiment.

FIG. 4 is an exploded perspective view illustrating the rotor of the motor according to the first embodiment.

FIG. 5 is a perspective view illustrating covers disposed on the rotor of the motor according to the first embodiment.

FIG. 6 is a plan view illustrating covers disposed on the rotor of the motor according to the first embodiment.

FIG. 7 is a bottom view illustrating the covers disposed on the rotor of the motor according to the first embodiment.

FIG. 8 is a cross-sectional view illustrating the covers disposed on the rotor of the motor according to the first embodiment.

FIG. 9 is a perspective view illustrating a motor according to a second embodiment.

FIG. 10 is a cross-sectional view taken along line A1-A1 in FIG. 9.

FIG. 11 is a perspective view illustrating a rotor of the motor according to the second embodiment.

FIG. 12 is an exploded perspective view illustrating the rotor of the motor according to the second embodiment.

FIG. 13 is a plan view illustrating a first embodiment of covers disposed on the rotor of the motor according to the second embodiment.

FIGS. 14A and 14B are views illustrating a second embodiment of the covers disposed on the rotor of the motor according to the second embodiment.

FIGS. 15A and 15B are views illustrating a third embodiment of the covers disposed on the rotor of the motor according to the second embodiment.

MODES OF THE INVENTION

Since the present invention may be variously changed and have various embodiments, particular embodiments will be exemplified and described in the drawings. However, the present invention is not limited to the particular embodiments and includes all changes, equivalents, and substitutes within the spirit and the scope of the present invention.

Further, it should be understood that, although the terms "second," "first," and the like may be used herein to describe various elements, the elements are not limited by the terms. The terms are only used to distinguish one element from another. For example, a first element could be termed a second element, and similarly, a second element could be termed a first element without departing from the scope of the present invention. The term "and/or" includes any one or any combination among a plurality of associated listed items.

When predetermined components are mentioned as being "linked," "coupled," or "connected" to other components, the components may be directly linked or connected to other components, but it should be understood that additional components may be present therebetween. On the other hand, when the predetermined components are mentioned as being "directly linked," "directly coupled," or "directly connected" to other components, it should be understood that no additional components are present between the above-described components.

In the description of the embodiments, when one element is disclosed to be formed "on or under" another element, the term "on or under" includes both a case in which the two elements are in direct contact with each other and a case in which at least other element is disposed between the two elements (indirectly). Further, when the term "on or under" is expressed, a meaning of not only an upward direction but also a downward direction with respect to one element may be included.

Terms used in the present invention are used just to describe the particular embodiments, and not to limit the present invention. The singular form is intended to also include the plural form, unless the context clearly indicates otherwise. It should be further understood that the terms "include," "including," "provide," "providing," "have," and/or "having" specify the presence of stated features, integers, steps, operations, elements, components, and/or groups thereof but do not preclude the presence or addition of one or more other features, integers, steps, operations, elements, components, and/or groups thereof.

Unless otherwise defined, all terms including technical or scientific terms used in the present invention have meanings the same as those of terms generally understood by those skilled in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the embodiments will be described in detail with reference to the accompanying drawing drawings, the same reference numerals are applied to the same or corresponding elements, and redundant description thereof will be omitted.

First Embodiment

FIG. 1 is a perspective view illustrating a motor according to a first embodiment, and FIG. 2 is a cross-sectional view taken along line A-A in FIG. 1.

Referring to FIGS. 1 and 2, a motor 1 according to the first embodiment may include a housing 100, a rotor 200, a stator 300, a shaft 400 which rotates with the rotor 200, a commutator 500, and a brush 600. As shown in FIG. 2, bearings 10 may be disposed at an upper portion and a lower portion of the shaft 400.

The motor 1 may be provided as a belt driven starter generator (BSG) capable of serving as a starter motor and an alternator as one structure.

The housing 100 may form an exterior of the motor 1.

The housing 100 may include a first housing 110 disposed at one side (an upper side) of the stator 300 and a second housing 120 disposed at the other side (a lower side) of the stator 300. For example, the first housing 110 and the second housing 120 may be disposed to be spaced apart from each other with the stator 300 therebetween.

The first housing 110 may include a first housing main body 111, and a brush holder 112 and terminals 113 disposed at respective sides of an upper portion of the first housing main body 111.

The first housing main body 111 and the brush holder 112 may be integrally formed. Further, the first housing main body 111 and the brush holder 112 may be formed of a synthetic resin material. Accordingly, a weight of the motor 1 may be reduced.

The terminals 113 may be electrically connected to an end portion of a coil 320 wound around the stator 300. As shown in FIGS. 1 and 2, each of the terminals 113 may be disposed so that one area thereof is exposed from the first housing main body 111. In this case, the terminals 113 may be disposed at the first housing main body 111 through an insert-injection manner.

The rotor 200 is disposed in the stator 300. Further, the shaft 400 may be disposed at a center of the rotor 200 to pass through the rotor 200.

FIG. 3 is a perspective view illustrating a rotor of the motor according to the first embodiment, and FIG. 4 is an exploded perspective view illustrating the rotor of the motor according to the first embodiment.

Referring to FIGS. 3 and 4, the rotor 200 may include a rotor core 210, coils 220 wound around the rotor core 210, and covers 230. Here, the covers 230 may be respectively disposed on and under the rotor core 210. In this case, the covers 230 respectively disposed on and under the rotor core 210 may be the same but are not necessarily limited thereto. For example, since shapes or arrangement positions of blades 233 disposed on the cover 230 in consideration of a gas flow may be variable, a shape of the upper cover 230 and a shape of the lower cover 230 may be different.

The rotor core 210 may be implemented in a form in which a plurality of plates having a form of a circular thin steel plate are stacked or in the form of one cylinder. A hole to which the shaft 400 is coupled may be formed in a center of the rotor core 210.

The coils 220 may be wound around the rotor core 210. Here, an example of the rotor 200 is a case in which the coils 220 are wound around the rotor core 210 but is not limited thereto.

When a current is supplied to the coils 220, an electrical interaction with the stator 300 is caused and thus the rotor 200 rotates. Here, the coils 220 may be referred to as first coils 220 to be distinguished from the coil wound around the stator 300.

The covers 230 may be respectively disposed on and under the rotor core 210.

The covers 230 may be disposed to cover the first coils 220. Accordingly, the covers 230 prevent the separation of the first coils 220.

Further, the covers 230 are coupled to the rotor core 210 and integrally rotate with the rotor core 210.

FIG. 5 is a perspective view illustrating covers disposed on the rotor of the motor according to the first embodiment, FIG. 6 is a plan view illustrating the covers disposed on the rotor of the motor according to the first embodiment, FIG. 7 is a bottom view illustrating the covers disposed on the rotor of the motor according to the first embodiment, and FIG. 8 is a cross-sectional view illustrating the covers disposed on the rotor of the motor according to the first embodiment. In a description of the covers 230 with reference to FIGS. 5 to 8, since arrangement positions of the covers 230 disposed on and under the rotor core 210 are different, the cover 230 disposed on the rotor core 210 will be described.

Each of the covers 230 may include a main body 231, cover holes 232, a plurality of blades 233, and first protruding parts 234. Further, the cover 230 may further include second protruding parts 235 and grooves 236. Here, the main body 231, the cover holes 232, the blades 233, the first protruding parts 234, the second protruding parts 235, and the grooves 236 may be formed by a die casting process. Accordingly, the main body 231, the blades 233, the first protruding parts 234, and the second protruding parts 235 may be integrally formed. In this case, the first protruding parts 234 may be referred to as first protrusions, and the second protruding parts 235 may be referred to as second protrusions.

The main body 231 of the cover 230 is coupled to the rotor core 210 and integrally rotates with the rotor core 210.

The main body 231 may be disposed on the rotor core 210. Accordingly, the main body 231 may be disposed to cover the first coils 220.

Referring to FIG. 5, the main body 231 may include a plate 237 and a sleeve 238.

The plate 237 is disposed on the rotor core 210. Here, the upper plate 237 may be formed in a disk shape, and a hole may be formed in a center of the upper plate 237 to dispose the shaft 400.

The sleeve 238 may protrude in a downward direction from an outer circumferential surface of the plate 237. In this case, the sleeve 238 may be disposed at an outer side of the rotor core 210 with respect to a radial direction. Here, the downward direction refers to a downward direction with respect to an axial direction, and an upward direction refers to a direction opposite the downward direction. Further, the axial direction (a direction C) may be a longitudinal direction of the shaft 400. In this case, the radial direction may be a direction perpendicular to the axial direction (the direction C).

As shown in FIG. 5, the sleeve 238 may be formed in a cylindrical shape.

The cover holes 232 may be formed in the plate 237 of the main body 231. The cover holes 232 may be formed to pass through the plate 237 in the axial direction.

Referring to FIG. 5, a plurality of cover holes 232 may be formed along a circumferential direction based on a center C. In this case, the cover holes 232 may be disposed at an inner side of the blades 233 with respect to the radial direction.

Since the blades 233 rotate, a gas flow is generated, and heat generated from the first coils 220 is discharged through cover holes 232. Accordingly, the first coils 220 may be cooled.

The blades 233 may be formed to protrude from the main body 231. For example, in the case of the cover 230 disposed on the rotor core 210, the blades 233 may be formed to protrude in an upward direction from the main body 231. Further, in the case of the cover 230 disposed under the rotor core 210, the blades 233 may be formed to protrude in a downward direction from the main body 231.

As shown in FIG. 5, the plurality of blades 233 may be spaced apart from each other along the circumferential direction and disposed on an upper surface 237a of the plate 237 of the main body 231. Further, the plurality of blades 233 may be disposed at an edge side based on the center C of the cover 230.

When the rotor 200 rotates, the blades 233 serve as a cooling fan which generates a gas flow. As shown in FIG. 5, the blades 233 may have a predetermined curvature or curved surface to easily generate the gas flow.

The first protruding parts 234 may be formed on the main body 231. As shown in FIG. 5, a plurality of first protruding parts 234 may be spaced apart from each other along the circumferential direction and formed on the main body 231. For example, the plurality of first protruding parts 234 may be disposed at the edge side based on the center C of the cover 230.

Here, an example in which the blades 233 are disposed at predetermined intervals is shown, but is not limited thereto. For example, the blades 233 may be disposed at irregular intervals.

The first protruding parts 234 may be disposed to protrude in the axial direction from the upper surface 237a of the main body 231. Here, since each of the first protruding parts 234 are formed with a predetermined height H1, a thickness of the plate 237 in the axial direction may be reduced. In this case, in consideration of a flow of air, the height H1 of each of the first protruding parts 234 may be formed to be smaller than a height H2 of each of the blades 233.

At least two first protruding parts 234 may be formed. However, three or more first protruding parts 234 may also be disposed to widely correspond to a balance correction point.

When the balance correction point is determined at a certain position of the plate 237, balancing the motor 1 may be performed by cutting one area of each of the first protruding parts 234 in response to the correction point. That is, the first protruding parts 234 are provided as cutting points.

The first protruding parts 234 may be disposed to protrude inward from an outer edge of the plate 237. That is, since the first protruding parts 234 are disposed at the outermost side based on the center C, a balancing amount may be minimally implemented.

Some of outer side surfaces 234a of the first protruding parts 234 may be disposed to extend an outer circumferential surface 237c of the plate 237. Referring to FIG. 6, some of the outer side surfaces 234a of the first protruding parts 234 and the outer circumferential surface 237c of the plate 237 may be formed with the same curvature (1/R).

Further, the first protruding parts 234 may be disposed between the blades 233.

The second protruding parts 235 may extend the first protruding parts 234 in a downward direction with respect to the plate 237 of the main body 231. For example, the plate 237 may be disposed between the first protruding parts 234 and the second protruding parts 235. In this case, the outer side surfaces 234a of the first protruding parts 234 and outer side surfaces 235a of the second protruding parts 235 may be disposed on the same vertical line.

Accordingly, the second protruding parts 235 may improve a possible balancing amount of the first protruding parts 234.

Further, the second protruding parts 235 may be formed to be symmetrical to the first protruding parts 234 with respect to the plate 237.

However, a protruding height of each of the second protruding parts 235 should be disposed in consideration of interference with the first coils 220. Accordingly, the second protruding parts 235 may be disposed between the first coils 220 based on the circumferential direction.

Referring to FIGS. 7 and 8, the second protruding parts 235 may be disposed to protrude in the axial direction from a lower surface 237b of the main body 231. In this case, a protruding length of each of the second protruding parts 235 is smaller than a length of the sleeve 238.

At least two second protruding parts 235 may be formed. However, as shown in FIG. 7, three or more second protruding parts 235 may also be disposed to widely correspond to the balance correction point.

When the balance correction point is determined at a certain position of the plate, in the case in which the one area of each of the first protruding parts 234 corresponding to the correction point is cut, the inside of each of the second protruding parts 235 may also be cut. Accordingly, a possible balancing amount of the motor 1 is further improved.

The second protruding parts 235 may be formed to protrude inward from an inner circumferential surface 238a of the sleeve 238.

The grooves 236 may be formed in upper surfaces 234b of the first protruding parts 234. In this case, since balancing of the first protruding parts 234 through weight reduction may be performed using a tool such as a drill, the grooves 236 may be formed in centers of the upper surfaces 234b. Accordingly, the grooves 236 may be provided as balancing points.

Meanwhile, the rotor 200 may further include insulators 240 disposed between the rotor core 210 and the coils 220. The insulators 240 insulate the rotor core 210 and the coils 220.

The stator 300 causes an electrical interaction with the rotor 200 to induce rotation of the rotor 200. The stator 300 may be disposed at an inner side of the housing 100.

The stator 300 may include a stator core 310 and the coil 320 wound around the stator core 310. Further, in the stator 300, an insulator (not shown) may be further disposed between the stator core 310 and the coil 320 to insulate the stator core 310 and the coil 320. Here, the coil 320 may be referred to as a second coil 320 to be distinguished from the coils 220 wound around the rotor 200.

The stator core 310 may be manufactured by coupling a plurality of divided cores or may be manufactured in the form of one core.

Further, an end portion of the second coil 320 wound around the stator core 310 may be electrically connected to the terminals 113 of the first housing 110.

Referring to FIGS. 1 and 2, the first housing 110 may be disposed at the upper side of the stator 300, and the second housing 120 may be disposed at the lower side of the stator 300.

Accordingly, the stator core 310 may be partially exposed through a space between the first housing 110 and the second housing 120. Accordingly, heat generated from the stator 300 may be easily discharged to the outside. However, the present invention is not limited thereto, and the stator 300 may be disposed inside the housing 100.

The shaft 400 rotates with the rotor 200 due to the rotation of the rotor 200. In this case, the shaft 400 may be rotatably supported in the housing 100 by the bearings 10.

Meanwhile, the motor 1 may include the commutator 500 and the brush 600 to supply a current to the rotating rotor 200. Here, an example in which the motor 1 supplies a current to the rotating rotor 200 through the commutator 500 and the brush 600 is described, but is not limited thereto.

The commutator 500 is coupled to the shaft 400. As shown in FIG. 2, the commutator 500 may be disposed on an outer circumferential surface of the shaft 400. Further, the commutator 500 may be disposed on the rotor 200. In addition, the commutator 500 may be electrically connected to the first coils 220 disposed in the rotor 200.

Meanwhile, the brush 600 may apply external driving signals to the rotor 200 by coming into contact with the commutator 500.

Here, the brush 600 may be inserted and installed in the brush holder 112 through an opening formed in one side of the brush holder 112. In this case, the brush 600 may come into close contact with the commutator 500 by an elastic member. Here, the brush holder 112 insulates the brush 600 from the outside.

Meanwhile, as shown in FIG. 1, the first housing 110 and the second housing 120 may respectively include a plurality of housing holes 114 and 121 formed along a circumferential direction. The housing holes 114 and 121 serve to discharge heat generated from the motor 1 to the outside.

When the rotor 200 rotates, a gas flow is generated by the blades 233, and heat generated from the first coils 220 is discharged through the cover holes 232. Further, the heat moves in a radial direction and is quickly discharged to the outside through the housing holes 114 and 121. The structure is advantageous for a motor in which a large amount of heat is generated by high speed rotation.

Second Embodiment

FIG. 9 is a perspective view illustrating a motor according to a second embodiment, and FIG. 10 is a cross-sectional view taken along line A1-A1 in FIG. 9.

Referring to FIGS. 9 and 10, a motor 1a according to the second embodiment may include a housing 1100, a rotor 1200, a stator 1300, a shaft 1400 which rotates with the rotor 1200, a commutator 1500, and a brush 1600. As shown in FIG. 10, bearings 10 may be disposed at an upper portion and a lower portion of the shaft 1400.

In comparison of the motor 1a according to the second embodiment and the motor 1 according to the first embodiment, the motor 1a according to the second embodiment has a difference in covers disposed in the rotor.

The motor 1a may be provided as a belt driven starter generator (BSG) capable of serving as a starter motor and an alternator as one structure.

The housing 1100 may form an exterior of the motor 1a.

The housing 1100 may include a first housing 1110 disposed at one side (an upper side) of the stator 1300 and a second housing 1120 disposed at the other side (a lower side) of the stator 1300. For example, the first housing 1110 and the second housing 1120 may be disposed to be spaced apart from each other with the stator 1300 therebetween.

The first housing 1110 may include a first housing main body 1111, and a brush holder 1112 and terminals 1113 disposed at respective sides of an upper portion of the first housing main body 1111.

The first housing main body 1111 and the brush holder 1112 may be integrally formed. Further, the first housing main body 1111 and the brush holder 1112 may be formed of a synthetic resin material. Accordingly, a weight of the motor 1a may be reduced.

The terminals 1113 may be electrically connected to an end portion of a coil 1320 wound around the stator 1300. As shown in FIGS. 9 and 10, each of the terminals 1113 may be disposed so that one area thereof is exposed from the first housing main body 1111.

The rotor 1200 is disposed in the stator 1300. Further, the shaft 1400 may be disposed at a center of the rotor 1200 to pass through the rotor 1200.

FIG. 11 is a perspective view illustrating a rotor of the motor according to the second embodiment, and FIG. 12 is an exploded perspective view illustrating the rotor of the motor according to the second embodiment.

Referring to FIGS. 11 and 12, the rotor 1200 may include a rotor core 1210, coils 1220 wound around the rotor core 1210, and covers 1230. Here, each of the covers 1230 may include a main body 1231, first holes 1232, a plurality of blades 1233, second holes 1234, and weight parts 1238 which move along the first holes 1232. Further, each of the weight parts 1238 may include a bolt 1238a and a weight 1238b.

Meanwhile, an example of the rotor 1200 is a case in which the coils 1220 are wound around the rotor core 1210 but is not limited thereto. For example, a magnet may be attached to the inside or an outer circumferential surface of the rotor core 1210.

When a current is supplied to the coils 1220, an electrical interaction with the stator 1300 is caused and thus the rotor 1200 rotates. Here, the coils 1220 may be referred to as first coils 1220 to be distinguished from the coil wound around the stator 1300.

As shown in FIGS. 11 and 12, the covers 1230 may be disposed on and under the rotor core 1210.

The covers 1230 may be disposed to cover the first coils 1220. Accordingly, the covers 1230 prevent the separation of the first coils 1220.

Further, the covers 1230 are coupled to the rotor core 1210 and integrally rotate with the rotor core 1210.

The main body 1231 of each of the covers 1230 is coupled to the rotor core 1210 and integrally rotates with the rotor core 1210.

The main body 1231 may be disposed to cover the first coils 1220.

FIG. 13 is a plan view illustrating a first embodiment of covers disposed on the rotor of the motor according to the second embodiment.

Referring to FIG. 13, the first holes 1232 may be formed in the main body 1231. Further, each of the first holes 1232 may be formed with a predetermined first length L1.

For example, the first hole 1232 may be provided as an elongated hole in a radial direction. In this case, the first hole 1232 has the predetermined first length L1 in a radial direction. Here, the radial direction may be a direction perpendicular to an axial direction (a direction C) in a plan view. Further, the axial direction is a longitudinal direction of the shaft 1400.

As shown in FIG. 13, the first holes 1232 may be disposed at a radially inner side with respect to the blades 1233.

The first holes 1232 may be disposed so that the weight parts 1238 are movable. Further, the first holes 1232 guide the movement of the weight parts 1238. That is, the weight parts 1238 may slidingly move along the first holes 1232.

In this case, a width of the first hole 1232 may be formed to be greater than a diameter at an end portion of the bolt 1238a coupled to the weight 1238b and smaller than a diameter of the weight 1238b.

A plurality of first holes 1232 may be formed in the main body 1231. As shown in FIG. 13, three first holes 1232 may be disposed at intervals of 120° along the circumferential direction based on a center C of the cover 1230. That is, the three first holes 1232 may be disposed to be rotationally symmetric based on the center C of the cover 1230.

An example in which the three first holes 1232 are disposed is described, but is not limited thereto. For example, two or more first holes 1232 may be disposed, and may be disposed to be rotationally symmetric based on a center C of the rotor 1200 in consideration of balance calibration.

The blades 1233 may be formed to protrude from the main body 1231. For example, in the case of the cover 1230 disposed on the rotor core 1210, the blades 1233 may be formed to protrude in an upward direction from the main body 1231. Further, in the case of the cover 1230 disposed under the rotor core 1210, the blades 1233 may be formed to protrude in a downward direction from the main body 1231.

As shown in FIG. 13, the plurality of blades 1233 may be spaced apart from each other along the circumferential direction and disposed on the main body 1231. For example, the plurality of blades 1233 may be disposed at an edge side based on the center C of the cover 1230.

When the rotor 1200 rotates, the blades 1233 serve as a cooling fan which generates a gas flow. As shown in FIG. 13, the blades 1233 may have a predetermined curvature or curved surface to easily generate the gas flow.

The second holes 1234 may be formed in the main body 1231. As shown in FIG. 13, a plurality of second holes 1234 may be spaced apart from each other along the circumferential direction and formed in the main body 1231. For example, the plurality of second holes 1234 may be disposed at the edge side based on the center C of the cover 1230.

Accordingly, since the blades 1233 rotate, a gas flow is generated, and heat generated from the first coils 1220 is discharged through the second holes 1234. Accordingly, the first coils 1220 may be cooled.

Here, an example in which the blades 1233 and the second holes 1234 are each disposed at predetermined intervals is shown, but is not limited thereto. For example, the intervals may be arranged irregularly.

Meanwhile, the blades 1233 and the second holes 1234 may be formed by a press process. For example, one area of the main body 1231 is cut and bent at the same time by the press process, and thus the blade 1233 is formed. Further, as the one area of the main body 1231 is bent, the second hole 1234 is also formed.

Accordingly, the second hole 1234 may be formed in a shape corresponding to a shape of the blade 1233. That is, the shape of the second hole 1234 may be the same as the shape of the blade 1233. Further, the second holes 1234 may be formed adjacent to the blades 1233.

Meanwhile, a central portion 1235 may be formed at a center of the cover 1230. The central portion 1235 may be provided as a hole to dispose the shaft 1400.

FIG. 14 is a view illustrating a second embodiment of the covers disposed on the rotor of the motor according to the second embodiment, wherein FIG. 14A is a perspective view of the covers according to the second embodiment, and FIG. 14B is a plan view of the covers according to the second embodiment.

Referring to FIG. 14, each of the covers 1230 according to the second embodiment may include a main body 1231, first holes 1232, a plurality of blades 1233, second holes 1234, a central portion 1235, and third holes 1236 formed in a circumferential direction from the first holes 1232. That is, in comparison with the covers 1230 according to the first embodiment and the covers 1230 according to the second embodiment, the covers 1230 according to the second embodiment have a difference in whether or not the third holes 1236 are formed.

The plurality of third holes 1236 may be disposed to be spaced apart from each other at predetermined intervals along a longitudinal direction of each of the first holes 1232. Further, each of the third holes 1236 may be formed with a predetermined second length L2 at a side portion of the first hole 1232 along the circumferential direction. In this case, the third holes 1236 may be formed at both sides of the first hole 1232.

Since the plurality of third holes 1236 are formed to extend from the first holes 1232 in the circumferential direction, the weight parts 1238 may widely correspond to a balance correction point through the third holes 1236. Here, the weight parts 1238 may move along the first holes 1232 or the third holes 1236.

For example, when the balance correction point is determined at a certain position of the third holes 1236, the weight parts 1238 are moved to the correction point and thus the rotor 1200 is balanced.

However, although the weight parts 1238 may easily correspond to the correction point when the second length L2 is large, the second length L2 may be restricted in consideration of the rigidity of the cover 1230.

In this case, a width of the third hole 1236 may be formed to be greater than the diameter at the end portion of the bolt 1238*a* and smaller than the diameter of the weight 1238*b*.

FIG. 15 is a view illustrating a third embodiment of the covers disposed on the rotor of the motor according to the second embodiment, wherein FIG. 15A is a perspective view of the covers according to the third embodiment, and FIG. 15B is a plan view of the covers according to the third embodiment.

Referring to FIG. 15, each of the covers 1230 according to the third embodiment may include a main body 1231, first holes 1232, a plurality of blades 1233, second holes 1234, a central portion 1235, and fourth holes 1237 formed in a direction perpendicular to a longitudinal direction of each of the first holes 1232.

The plurality of fourth holes 1237 may be disposed to be spaced apart from each other at predetermined intervals along the longitudinal direction of each of the first holes 1232. Further, each of the fourth holes 1237 may be formed to protrude from a side portion of the first hole 1232 with a predetermined third length L3. In this case, the fourth holes 1237 may be formed in a direction perpendicular to the longitudinal direction of each of the first holes 1232.

Further, the third length L3 may be formed to be greater than a diameter at an end portion of a bolt 1238*a* and smaller than a diameter of a weight 1238*b*. In this case, a width of the fourth hole 1237 may be formed to be greater than the diameter at the end portion of the bolt 1238*a* and smaller than the diameter of the weight 1238*b*.

Accordingly, the fourth holes 1237 serve to prevent the weight parts 1238 from moving in a radial direction in response to a centrifugal force which acts on the rotor 1200.

For example, the weight parts 1238 which move in the radial direction along the first holes 1232 are disposed in the fourth holes 1237 to adjust the balance and cope with the centrifugal force generated in the rotor 1200.

The weight parts 1238 may perform a balance calibration operation of the rotor 1200 through mass movement. In this case, the weight parts 1238 may be disposed to be movable along the first holes 1232. Further, the weight parts 1238 may be fixed to arbitrary points of the first holes 1232 to balance the rotor 1200.

Referring to FIG. 12, each of the weight parts 1238 may include the bolt 1238*a* and the weight 1238*b*.

The bolts 1238*a* may be disposed through the first holes 1232. Further, the weights 1238*b* may be disposed at end portions of the bolts 1238*a*. In this case, the end portions of the bolts 1238*a* and the weights 1238*b* may be screw-coupled to each other.

For example, the bolts 1238*a* are disposed through the first holes 1232 at an upper portion of the main body 1231, and the weights 1238*b* are coupled to the end portions of the bolts 1238*a* at a lower portion of the main body 1231. Further, when the bolts 1238*a* are rotated, the bolts 1238*a* and the weights 1238*b* approach each other to be fixed to the main body 1231.

Here, as shown in FIG. 12, an example in which the weight 1238*b* is formed in a cylindrical shape is described, but is not limited thereto. For example, the weight 1238*b* may be formed in a cubic shape in which a hole is formed in a center thereof. In this case, a width of the cubic-shaped weight may be formed to be greater than the width of the first hole 1232.

Further, the weight 1238*b* may be provided in various weights.

Accordingly, the weight parts 1238 move along the first holes 1232, and then are fixed to the main body 1231 according to the rotation of the bolts 1238*a* or the weights 1238*b*. Specifically, the weight parts 1238 move along the first holes 1232 and then are fixed to the arbitrary points of the first holes 1232.

Here, an example in which the weight parts 1238 are disposed in the first holes 1232 is described but is not limited thereto. For example, in the case of the covers 1230 according to the second embodiment, the weight parts 1238 may be disposed in the third holes 1236. Further, in the case of the covers 1230 according to the third embodiment, the weight parts 1238 may be disposed in the fourth holes 1237.

Accordingly, when the balance correction point of the rotor 1200 is determined, the rotor 1200 is balanced by moving the weight parts 1238 to the correction point.

Meanwhile, the rotor 1200 may further include insulators 1240 disposed between the rotor core 1210 and the coils 1220. The insulators 1240 insulate the rotor core 1210 and the coils 1220.

The stator 1300 causes an electrical interaction with the rotor 1200 to induce rotation of the rotor 1200. The stator 1300 may be disposed at an inner side of the housing 1100.

The stator 1300 may include a stator core 1310 and the coil 1320 wound around the stator core 1310. Further, in the stator 1300, an insulator (not shown) may be further disposed between the stator core 1310 and the coil 1320 to insulate the stator core 310 and the coil 320. Here, the coil 1320 may be referred to as a second coil 1320 to be distinguished from the coils 1220 wound around the rotor 1200.

The stator core 1310 may be manufactured by coupling a plurality of divided cores or may be manufactured in the form of one core.

Further, an end portion of the second coil 1320 wound around the stator core 1310 may be electrically connected to the terminals 1113 of the first housing 1110.

Referring to FIGS. 9 and 10, the first housing 1110 may be disposed at the upper side of the stator 1300, and the second housing 1120 may be disposed at the lower side of the stator 1300.

Accordingly, the stator core 1310 may be partially exposed through a space between the first housing 1110 and the second housing 1120. Accordingly, heat generated from the stator 1300 may be easily discharged to the outside. However, the present invention is not limited thereto, and the stator 1300 may be disposed inside the housing 1100.

The shaft 1400 rotates with the rotor 1200 by the rotation of the rotor 1200. In this case, the shaft 1400 may be rotatably supported in the housing 1100 by the bearings 10.

Meanwhile, the motor 1a may include the commutator 1500 and the brush 1600 to supply a current to the rotating rotor 1200. Here, an example in which the motor 1a supplies the current to the rotating rotor 1200 through the commutator 1500 and the brush 1600 is described, but is not limited thereto.

The commutator 1500 is coupled to the shaft 1400. As shown in FIG. 10, the commutator 1500 may be disposed on an outer circumferential surface of the shaft 1400. Further, the commutator 1500 may be disposed on the rotor 1200. In addition, the commutator 1500 may be electrically connected to the first coils 1220 disposed in the rotor 1200.

Meanwhile, the brush 1600 may apply external driving signals to the rotor 1200 by coming into contact with the commutator 1500.

Here, the brush 1600 may be inserted and installed in the brush holder 1112 through an opening formed in one side of the brush holder 1112. In this case, the brush 1600 may come into close contact with the commutator 1500 by an elastic member. Here, the brush holder 1112 insulates the brush 1600 from the outside.

Meanwhile, as shown in FIG. 9, the first housing 1110 and the second housing 1120 may respectively include a plurality of housing holes 1114 and 1121 formed along a circumferential direction. The housing holes 1114 and 1121 serve to discharge heat generated from the motor 1a to the outside. Here, the housing holes 1114 and 1121 may be referred to as through holes.

When the rotor 1200 rotates, a gas flow is generated by the blades 1233, and heat generated from first coils 1220 is discharged through the second holes 1234. In this case, the heat may also be discharged through the first holes 1232. Further, the heat is quickly discharged to the outside through the housing holes 1114 and 1121. The structure is advantageous for a motor in which a large amount of heat is generated by high speed rotation.

Although the above-described descriptions are described with reference to the embodiments of the present invention, it should be understood that those skilled in the art may be capable of variously modifying and changing the present invention within the spirit and the scope disclosed in the claims which will be described below. Further, differences related to modifications and changes should be understood as being included in the scope of the present invention defined in the appended claims.

REFERENCE NUMERALS 1, 1a: motor, 10: bearing, 100, 1100: housing, 110, 1110: first housing, 120, 1120: second housing, 200, 1200: rotor, 210, 1210: rotor core, 220,1220: coil, 230, 1230: cover, 231, 1231: main body, 1232: first hole, 233, 1233: blade, 1234: second hole, 1236: third hole, 1237: fourth hole, 1238: weight part, 1238a: bolt, 1238b: weight, 300, 1300: stator, 310, 1310: stator core, 400, 1400: shaft, 500, 1500: commutator, 600, 1600: brush

The invention claimed is:

1. A rotor comprising:
a rotor core;
a coil wound around the rotor core; and
covers disposed on the rotor core,
wherein each of the covers includes a main body disposed on the rotor core, a plurality of blades disposed on an upper surface of the main body, at least two first protruding parts protruding from the upper surface of the main body in an axial direction, and at least two second protruding parts, wherein:
the main body includes a plate disposed on the rotor core and disposed to cover the coil, and a sleeve protruding from an outer circumferential surface of the plate in an axial direction,
the first protruding parts protrude in the axial direction from an upper surface of the plate which covers the coil, and the second protruding parts protrude in the axial direction from a lower surface of the plate which covers the coil, and
wherein outer side surfaces of the first protruding parts and outer side surfaces of the second protruding parts are disposed on a same vertical line corresponding to the axial direction.

2. The rotor of claim 1, wherein:
the plate is disposed between the first protruding parts and the second protruding parts; and
the second protruding parts extend the first protruding parts in a downward direction.

3. The rotor of claim 2, wherein the second protruding parts protrude in an inward direction from an inner circumferential surface of the sleeve.

4. The rotor of claim 3, wherein the first protruding parts are disposed to protrude inward from an outer edge of the plate, and are disposed between the blades.

5. The rotor of claim 4, wherein some of the outer side surfaces of the first protruding parts and the outer circumferential surface of the plate have the same curvature.

6. The rotor of claim 4, wherein a height of the first protruding part is smaller than a height of the blade.

7. The rotor of claim 1, wherein a groove is concavely formed in an upper surface of each of the first protruding parts.

8. A motor comprising:
a shaft;
a rotor in which the shaft is disposed;
a stator disposed at an outer side of the rotor; and
a housing disposed at the stator,
wherein the rotor includes a rotor core, a coil wound around the rotor core, and covers disposed on the rotor core, and each of the covers includes a main body disposed on the rotor core, a plurality of blades disposed on an upper surface of the main body, at least two first protruding parts protruding from the upper surface of the main body in an axial direction, and at least two second protruding parts, wherein:

the main body includes a plate disposed on the rotor core and disposed to cover the coil, and a sleeve protruding from an outer circumferential surface of the plate in an axial direction, the first protruding parts protrude in the axial direction from an upper surface of the plate which covers the coil, and the second protruding parts protrude in the axial direction from a lower surface of the plate which covers the coil, and wherein outer side surfaces of the first protruding parts and outer side surfaces of the second protruding parts are disposed on a same vertical line corresponding to the axial direction.

9. The motor of claim 8,
wherein the second protruding parts extend the first protruding parts in a downward direction with respect to the main body.

10. The motor of claim 9, wherein a groove is concavely formed in an upper surface of each of the first protruding parts.

11. The motor of claim 8, wherein:
the housing includes a first housing disposed on the stator, and a second housing disposed under the stator; and
a housing hole is formed in each of outer circumferential surfaces of the first housing and the second housing.

12. The motor of claim 11, wherein heat generated from the rotor moves in a radial direction due to rotation of the blades and is discharged through the housing holes.

13. The motor of claim 12, wherein:
the main body further includes a plurality of cover holes formed along a circumferential direction; and
heat generated from the coil of the rotor is discharged through the cover holes formed in the main body.

* * * * *